United States Patent [19]
Yoo et al.

[11] Patent Number: 6,081,498
[45] Date of Patent: Jun. 27, 2000

[54] OPTICAL PICKUP COMPATIBLE WITH RECORDABLE COMPACT DISK AND DIGITAL VIDEO DISK USING PLANE PARALLEL PLATES

[75] Inventors: Jang-hoon Yoo; Chul-woo Lee, both of Seoul; Chong-sam Chung, Sungnam, all of Rep. of Korea

[73] Assignee: Samsung Electronics Co., Ltd., Suwon, Rep. of Korea

[21] Appl. No.: 09/014,621

[22] Filed: Jan. 28, 1998

[30] Foreign Application Priority Data

Jan. 28, 1997 [KR] Rep. of Korea .......................... 97-2497

[51] Int. Cl.$^7$ ........................................................ G11B 7/00
[52] U.S. Cl. .................................................................. 369/112
[58] Field of Search ............................... 369/44.23, 44.29, 369/44.37, 110, 94, 112, 58, 118, 54

[56] References Cited

U.S. PATENT DOCUMENTS

| | | | |
|---|---|---|---|
| 4,968,874 | 11/1990 | Kasuga | 250/201 |
| 5,303,221 | 4/1994 | Maeda et al. | 369/112 |
| 5,615,200 | 3/1997 | Hoshino et al. | 369/112 |
| 5,671,207 | 9/1997 | Park | 369/44.23 |
| 5,757,742 | 5/1998 | Akiba et al. | 369/58 |
| 5,793,734 | 8/1998 | Tsuchiya et al. | 369/44.23 |
| 5,875,167 | 2/1999 | Katayama | 369/44.37 |
| 5,912,868 | 6/1999 | Hayashi et al. | 369/58 |
| 5,999,509 | 12/1999 | Sugiura et al. | 369/94 |

FOREIGN PATENT DOCUMENTS

| | | |
|---|---|---|
| 0 747 893 A2 | 12/1996 | European Pat. Off. . |
| 0 803 867 A2 | 10/1997 | European Pat. Off. . |
| 6-259804 | 9/1994 | Japan . |
| 7-50018 | 2/1995 | Japan . |
| 8-55363 | 2/1996 | Japan . |
| 8-55367 | 2/1996 | Japan . |
| 8-138247 | 5/1996 | Japan . |
| 8-249708 | 9/1996 | Japan . |
| 8-297854 | 11/1996 | Japan . |

Primary Examiner—Thang V. Tran
Attorney, Agent, or Firm—Staas & Halsey LLP

[57] ABSTRACT

An optical pickup is compatible with at least two types of optical recording media each using light beams having different wavelengths from one another and which are used for recording and reproducing information. The optical pickup includes a first laser light source for emitting a first light beam having a relatively long wavelength, and a second laser light source for emitting a second light beam having a relatively short wavelength. A beam splitting plate transmits the first light beam and reflects the second light beam toward a collimator. The collimator collimates the light beam incident from the beam splitting plate to transmit the collimated light beam into an objective lens. The objective lens is designed so that the second light beam is focused on the information recording surface of a second optical recording medium whose information recording surface is closer to the objective lens than the information recording surface of the first optical recording medium, to form an optical spot optimized to the second optical recording medium. The optical distance from the first laser light source to the information recording surface of a first optical recording medium whose information recording surface is relatively farther from the objective lens, is shorter than the optical distance from the second laser light source to the information recording surface of the second optical recording medium so that spherical aberration occurring when the first light beam is used is removed. An aberration correction plate is located on an optical path between the first laser light source and the beam splitting plate, and corrects an optical aberration occurring when the beam splitting plate is used.

34 Claims, 5 Drawing Sheets

OPTICAL PICKUP COMPATIBLE WITH RECORDABLE COMPACT DISK AND DIGITAL VIDEO DISK USING PLANE PARALLEL PLATES

BACKGROUND OF THE INVENTION

1. Field of the Invention

The present invention relates to an optical pickup compatible with a recordable compact disk (CD-R) and a digital video disk (DVD), and more particularly, to an optical pickup which can record and reproduce signals with respect to a DVD and a CD-R.

A disk, a card or a tape may be used as a recording medium for recording and reproducing information such as video, audio or data at high density. Among them, a disk-shaped recording medium is mainly used. Recently, products in the field of optical disk devices have been developed from laser disks (LDs) and compact disks (CDs) to DVDs. Such optical disks comprise a plastic or glass medium having a certain thickness for transmitting a beam of light incident from an optical pickup, and an information recording surface located on the medium and on which information is recorded.

A high-density optical disk system developed up to now enlarges a numerical aperture of an objective lens and uses a relatively short-wavelength light source of 635 nm or 650 nm, to heighten a recording density. As a result, the optical disk system can record and reproduce information with respect to a DVD and can also reproduce information recorded on a CD. The high-density optical disk system uses a light source outputting light whose wavelength is 780 nm, to compatibly use a recordable compact disk (CD-R), which is a recent type of a CD. This is due to a recording characteristic of the CD-R. It is a very essential technique for compatibility between a DVD and a CD-R to enable a single optical pickup to use both the light having a wavelength of 780 nm and the light having a wavelength of 650 nm. An existing optical pickup which is compatible with a DVD and a CD-R is described below with reference to FIG. 1.

FIG. 1 shows an optical pickup which uses a single objective lens, and two laser diodes as light sources for a DVD and a CD-R, respectively. The optical pickup shown in FIG. 1 uses laser light whose wavelength is 635 nm during reproduction with respect to a DVD, and uses laser light whose wavelength is 780 nm during recording and reproduction with respect to a CD-R. A light source 1, which is a laser diode, emits a beam of light having a 635 nm wavelength which passes through a collimating lens 2 and a polarization beam splitter 3, and then proceeds to an interference filter prism 4. A light source 11, which is a laser diode, emits a beam of light having a 780 nm wavelength which passes through a collimating lens 12 and a beam splitter 13, and then proceeds to a converging lens 14. The converging lens 14 makes the beam of light incident from the beam splitter 13 converge into the prism 4. An optical system having such a structure for converging the beam of light whose wavelength is 780 nm is called a "finite optical system." The prism 4 transmits the 635 nm wavelength light which is incident after being reflected by the polarization beam splitter 3, and reflects the light beam converged by the converging lens 14. As a result, the light emitted from the light source 1 is incident to a quarter-wave plate 5 in the form of a light beam made parallel by the collimating lens 2, and the light emitted from the light source 11 is incident to the quarter-wave plate 5 in the form of a light beam diverged by the converging lens 14 and the prism 4. The light transmitted through the quarter-wave plate 5 is incident to an objective lens 7.

The objective lens 7 which is designed to have a focus on an information recording surface of a DVD 8 having a thickness of 0.6 mm, focuses the 635 nm wavelength light beam emitted from the light source 1 on the information recording surface of the DVD 8. As a result, the light reflected from the information recording surface of the DVD 8 contains the information recorded on the information recording surface. The reflected light is transmitted through the polarization beam splitter 3 and is incident to an optical detector 10 for detecting optical information.

In the case that the above-described finite optical system is not employed, when the beam of the 780 nm wavelength light emitted from the light source 11 is focused on the information recording surface of a CD-R 9 having a thickness of 1.2 mm by using the objective lens 7, spherical aberration occurs due to a difference between the DVD 8 and the CD-R 9 in thickness. The spherical aberration is due to the fact that the information recording surface of the CD-R 9 is located at a farther place from the objective lens 7 than that of the DVD 8. To reduce the spherical aberration, the finite optical system constituted by using the converging lens 14 is required. By use of a variable aperture 6 to be described later with reference to FIG. 2, the beam of the 780 nm wavelength light is formed as an optical spot of an optimized size on the information recording surface of the CD-R 9. The beam of the 780 nm wavelength light reflected from the CD-R 9 reflects from the prism 4, transmits through the converging lens 14, and reflects from the beam splitter 13, and then, is incident to a photodetector 15. The photodetector 15 detects information from the light incident from the beam splitter 13.

The variable aperture 6 shown in FIG. 1 has a structure of a thin film which can selectively transmit the incident light, with respect to a region identical to a diameter of the objective lens 7, that is, a region having a numerical aperture (NA) not more than 0.6 shown in FIG. 2. In other words, the optical surface of the variable aperture 6 is divided into a region "1" which transmits both the 635 nm wavelength light and the 780 nm wavelength light and a "region 2" which totally transmits the 635 nm wavelength light and totally reflects the 780 nm wavelength light, on the basis of the center of the optical surface. The region 1 is an area of the numerical aperture (NA) not more than 0.45. The region 2 is an outer area of the region 1 and is made by coating a dielectric thin film thereon. The region 1 comprises a quartz ($SiO_2$) thin film to remove optical aberration generated by the dielectric thin film coated region 2. Using the variable aperture 6, the 780 nm wavelength light which is transmitted through the region 1 of the numerical aperture (NA) not more than 0.45 is formed as an optical spot optimized to the information recording surface of the CD-R 9. Thus, the optical pickup of FIG. 1 can record and pick up information with respect to a CD-R 9, even when a loaded disk is changed from the DVD 8 to the CD-R 9.

However, the above-described optical pickup of FIG. 1 should achieve a finite optical system with respect to the 780 nm wavelength light, to remove the spherical aberration occurring due to the compatibility between a DVD and a CD-R. Also, due to the dielectric thin film which is formed in the region 2 having the numerical aperture (NA) not less than 0.45 of the variable aperture 6, an optical path difference occurs between the light passed through the region 1 and the light passed through the region 2. To remove this optical path difference, the variable aperture 6 requires a particular optical thin film such as a quartz thin film formed on the region 1. For this reason, a quartz coating is formed on the region 1 and a multi-layered thin film is formed on the region 2, which causes a complicated manufacturing process. Also, the thickness of the thin film is adjusted on a μm scale, which does not fit mass-production.

SUMMARY OF THE INVENTION

To solve the above problems, it is an object of the present invention to provide an optical pickup which can be compatible with different types of optical recording media, using a beam splitting plate having a wavelength-selective transmission characteristic with respect to the beams of light of different wavelengths and another plate which corrects an optical aberration occurring when the beam splitting plate is used.

Additional objects and advantages of the invention will be set forth in part in the description which follows and, in part, will be obvious from the description, or may be learned by practice of the invention.

To accomplish the above and other objects of the present invention, there is provided an optical pickup which is compatible with at least two types of optical recording media, the optical pickup comprising:

a first laser light source for emitting a first light beam having a relatively long wavelength; a second laser light source for emitting a second light beam having a relatively short wavelength; an objective lens for focusing the second light beam emitted from said second laser light source on the information recording surface of a second optical recording medium whose information recording surface is closer to the objective lens, to form an optical spot optimized to said second optical recording medium; a collimator for collimating a beam of light incident to transmit the collimated light beam to the objective lens; a beam splitting plate for transmitting a beam of light from one laser light source and reflecting a beam of light from the other laser light source, to transmit the beams of light to said collimator; and an aberration correction plate located on an optical path between the beam splitting plate and one of said first and second laser light sources, for correcting an optical aberration occurring when the beam splitting plate is used, wherein the optical distance from said first laser light source to the information recording surface of a first optical recording medium whose information recording surface is relatively farther from the objective lens, is shorter than the optical distance from said second laser light source to the information recording surface of said second optical recording medium, thereby removing a spherical aberration occurring when the first light beam is used.

There is also provided an optical pickup which is compatible with at least two types of optical recording media, the optical pickup comprising:

a first laser light source for emitting a first light beam having a relatively long wavelength; a second laser light source for emitting a second light beam having a relatively short wavelength; an objective lens for focusing the second light beam emitted from said second laser light source on the information recording surface of a second optical recording medium whose information recording surface is located closer to the objective lens, to form an optical spot optimized to said second optical recording medium;

a collimator for collimating a beam of light being incident to transmit the collimated light beam to the objective lens; a beam splitting plate for transmitting a beam of light from one laser light source and reflecting a beam of light from the other laser light source, to transmit the beams of light to said collimator; and an aberration correction plate for reflecting a light beam being incident from said beam splitting plate to transmit the reflected light beam into said collimator, and for correcting an optical aberration occurring when the beam splitting plate is used, wherein the optical distance from said first laser light source to the information recording surface of a first optical recording medium whose information recording surface is relatively farther from the objective lens, is shorter than the optical distance from said second laser light source to the information recording surface of said second optical recording medium, thereby removing a spherical aberration occurring when the first light beam is used.

BRIEF DESCRIPTION OF THE DRAWINGS

The preferred embodiments are described with reference to the drawings wherein.

DETAILED DESCRIPTION OF THE PREFERRED EMBODIMENTS

Figure 1:
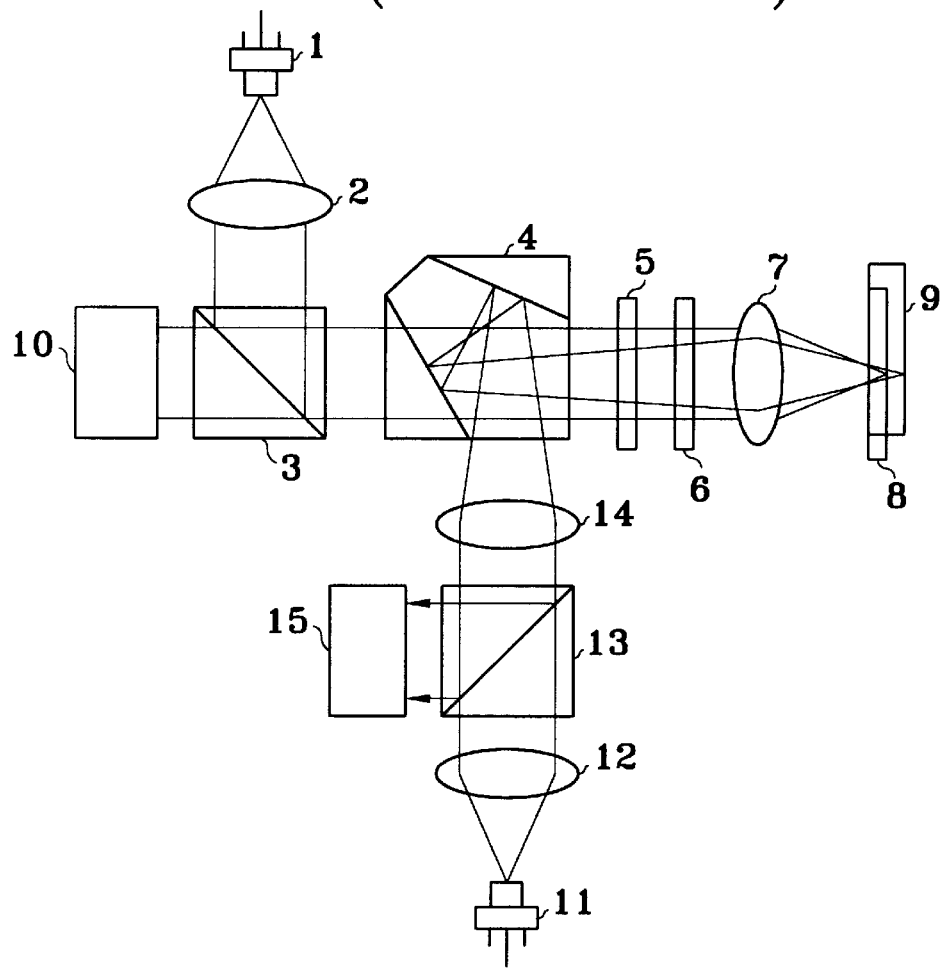
FIG. 1 is a view showing an optical system of an optical pickup which is compatible with a DVD and a CD-R, which includes a single objective lens and two laser diodes as light sources for the DVD and CD-R, respectively.
Figure 2:
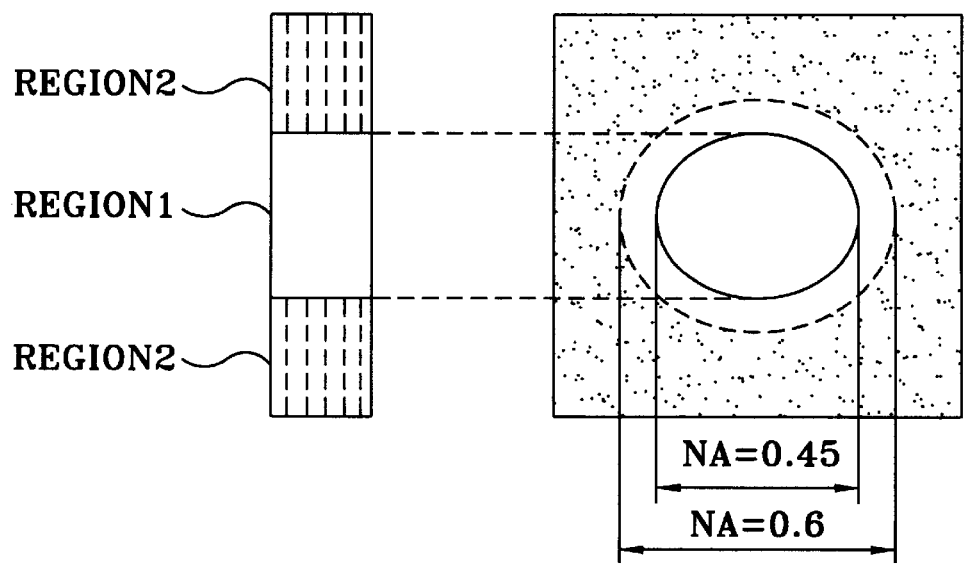
FIG. 2 is a view for explaining a variable aperture shown in FIG. 1.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
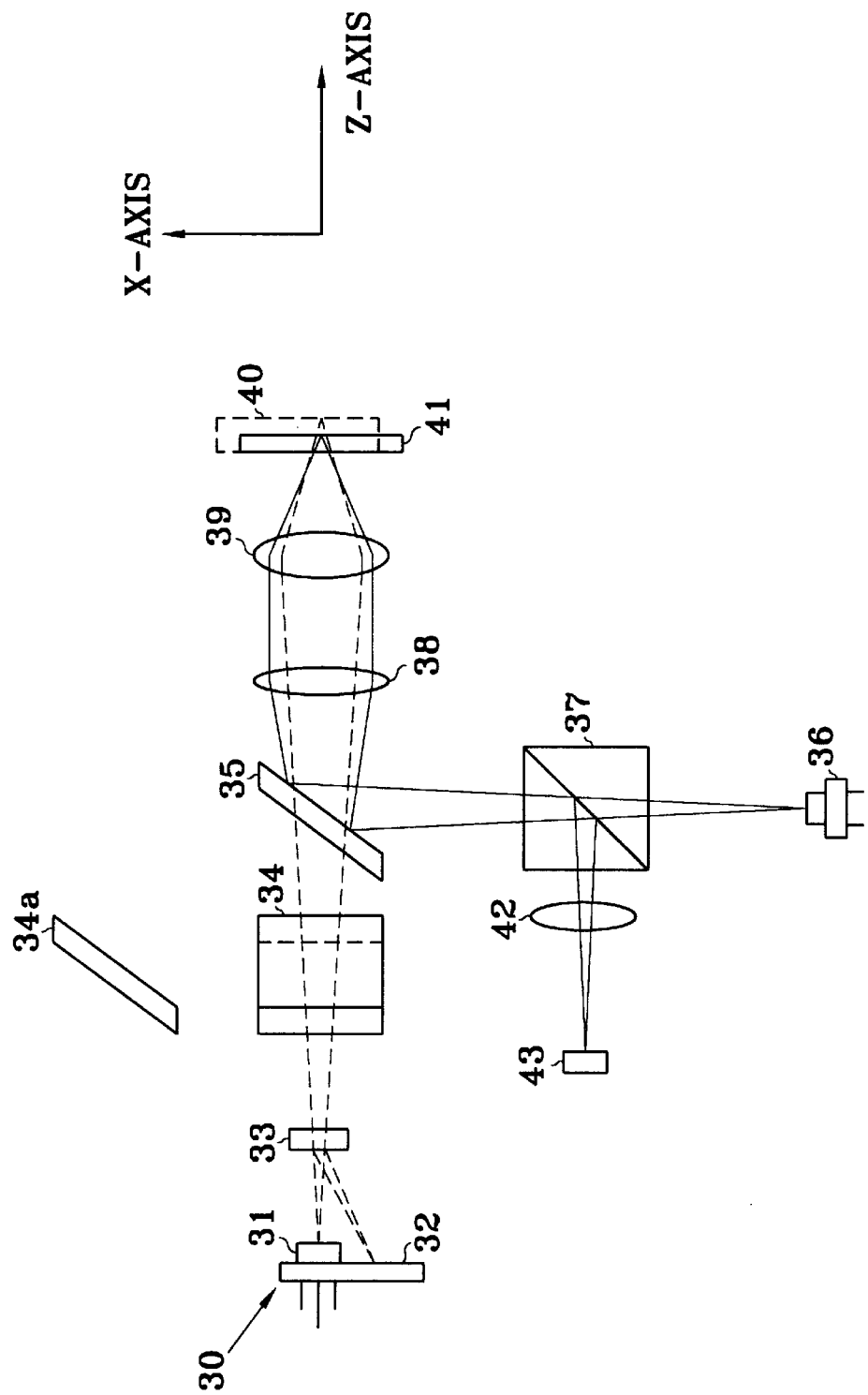
FIG. 3 is a view showing an optical system of an optical pickup according to a first embodiment of the present invention.

FIG. 3 is a view showing an optical system of an optical pickup which is compatible with a DVD and a CD-R according to a first embodiment of the present invention. The optical pickup shown in FIG. 3 includes an optical unit 30 which is a single module being integrated with a laser light source 31 and an optical detector 32. The laser light source 31 emits a first light whose wavelength is 780 nm for recording and reproducing a signal with respect to a CD-R 40. A beam of the first light is shown as dotted lines in FIG. 3. The optical detector 32, which detects the first light returning after being reflected from the information recording surface of the CD-R 40, receives the first light whose optical path is changed by a holographic beam splitter 33. A laser light source 36 emits a second light whose wavelength is 650 nm for recording and reproducing a signal with respect to a DVD 41. The beam of the second light is shown as solid lines in FIG. 3.

The optical pickup of FIG. 3 also includes a beam splitting plate 35. The beam splitting plate 35 can make the optical pickup of FIG. 3 wavelength-selectively use the first light of the 780 nm wavelength and the second light of the 650 nm wavelength. Therefore, the FIG. 3 optical pickup uses two laser light sources 31 and 36, a beam splitting plate 35 and a single objective lens 39, to perform recording and pickup operations of signals with respect to a CD-R 40 and a DVD 41.

The beam splitting plate 35 is designed to have a form of a plane-parallel plate and has a structure that an optical thin film is formed on the surface of a plate glass. For reference, the beam splitting plate 35 made of a plate glass costs less and is fabricated easily, and accordingly, it is widely used for manufacture of an existing CD-dedicated optical pickup. As shown in FIG. 3, the beam splitting plate 35 is located in an optical path between the laser light source 31 and a collimator 38 to be described later. For convenience of explanation, it is assumed that an optical axis of the direction proceeding from the laser light source 31 via the optical center of the objective lens 39 is coincident with a positive direction of a Z-axis on a rectangular coordinate system and a Y-axis is parallel to the direction which perpendicularly protrudes from a surface of the drawing paper toward a viewer. The planes of the beam splitting plate 35 are aligned in parallel to the plane obtained by rotating the XY-plane clockwise through an angle of 45 degrees centered around the positive Y-axis. The laser light source 36 is aligned so that the second light emitted from the laser light source 36 is reflected from the beam splitting plate 35 and then is incident to the objective lens 39. The beam splitting plate 35 has the optical characteristic that transmits the first light emitted from the laser light source 31 and reflects the second light emitted from the laser light source 36. Thus, the second light reflected from the beam splitting plate 35 proceeds toward the objective lens 39.

The collimator 38 is located in an optical path between the beam splitting plate 35 and the objective lens 39. When the optical pickup of FIG. 3 uses the first light of the 780 nm wavelength, the collimator 38 makes the beam of the first light incident from the beam splitting plate 35 substantially parallel with the optical axis of the objective lens 39. In reality, the beam of the first light passing between the collimator 38 and the objective lens 39 becomes a slightly diverging shape as shown in FIG. 3. When the optical pickup of FIG. 3 uses the second light of the 650 nm wavelength, the collimator 38 makes the second light incident from the beam splitting plate 35 perfectly parallel with the optical axis of the objective lens 39. The objective lens 39 to which the first light and the second light passing through the collimator 38 are incident is designed to accurately focus the second light of the 650 nm wavelength emitted from the laser light source 36 on the information recording surface of the DVD 41. Therefore, the beam of the second light is formed as an optimized optical spot on the information recording surface of the DVD 41.

Meanwhile, when a loaded disk is changed from the DVD 41 into a CD-R 40, the first light of the 780 nm wavelength is used, and consequently a spherical aberration occurs. As a result, the size of an optical spot formed on the information recording surface of the CD-R 40 by the first light becomes not less than 1.8 $\mu$m. By the way, the size of an optical spot required for recording and pickup of a signal with respect to the CD-R is generally about 1.4 $\mu$m. Therefore, the optical pickup of FIG. 3 cannot record or pick up information with respect to the CD-R 40.

For this reason, the optical pickup of FIG. 3 is designed so that an optical distance from the laser light source 31 to the information recording surface of the CD-R 40 is shorter than that from the laser light source 36 to the information recording surface of the DVD 41. By doing so, the spherical aberration occurring when the first light is used is removed, with a result being that the beam of the first light focused by the objective lens 39 is formed as an optimized optical spot on the information recording surface of the CD-R 40. Then, the size of the optical spot being formed on the information recording surface of the CD-R 40 becomes 1.4 $\mu$m. Thus, the optical pickup of FIG. 3 can record and pick up information by using the first light with respect to the CD-R 40.

When the CD-R 40 is used, the first light reflected from the information recording surface of the CD-R 40 is transmitted through the objective lens 39 and incident to the collimator 38. The collimator 38 makes the beam of the first light incident from the objective lens 39 to be incident to the beam splitting plate 35 in the form of a convergent light beam. The beam splitting plate 35 transmits the first light convergently incident from the collimator 38. The first light transmitted through the beam splitting plate 35 proceeds toward the optical detector 32 of the optical unit 30 by the holographic beam splitter 33. Meanwhile, when the DVD 41 is used, the second light reflected from the information recording surface of the DVD 41 is transmitted through the objective lens 39 and the collimator 38 in sequence, and then is incident to the beam splitting plate 35. The beam splitting plate 35 reflects the second light incident from the collimator 38 toward a beam splitter 37. The beam splitter 37 reflects the second light incident from the beam splitting plate 35 and makes the reflected second light proceed toward a lens 42. The lens 42 which is located in an optical path between the beam splitter 37 and the optical detector 43, focuses the incident light on the optical detector 43.

However, in the optical pickup having the above-described optical structure, since the first light having the 780 nm wavelength is transmitted through the beam splitting plate 35, astigmatism occurs. An aberration correction plate 34 is used to remove the astigmatism, which is located between the beam splitter 33 and the beam splitting plate 35. The aberration correction plate 34 is fabricated in the form of a plane-parallel plate, and the optical surfaces of the aberration correction plate 34 are aligned in parallel to the surface obtained by rotating the XY-plane clockwise through an angle of 45 degrees centered around the positive X-axis (or by rotating the XY-plane counterclockwise through an angle of 45 degrees centered around the negative X-axis). When a viewer views the drawing from the top to the bottom thereof, the aberration correction plate 34 appears as an aberration correction plate 34a shown in the upper portion of the drawing relative to the aberration correction plate 34. The aberration correction plate 34 has the same thickness as that of the beam splitting plate 35, so that astigmatism occurring when the first light passes through the beam splitting plate 35 is offset. Thus, the optical pickup of FIG. 3 is compatible with the CD-R 40 and the DVD 41, using a single objective lens 39.

The beam splitting plate 35 can be modified to have optical characteristics of reflecting the first light of the 780 nm wavelength and transmitting the second light of the 650 nm wavelength. In this case, the laser light source 31 is installed in the position of the laser light source 36, and the laser light source 36 is installed in the position of the laser light source 31. Also, then the aberration correction plate 34 would have an optical characteristic of transmitting the second light of the 650 nm wavelength.

Figure 4:
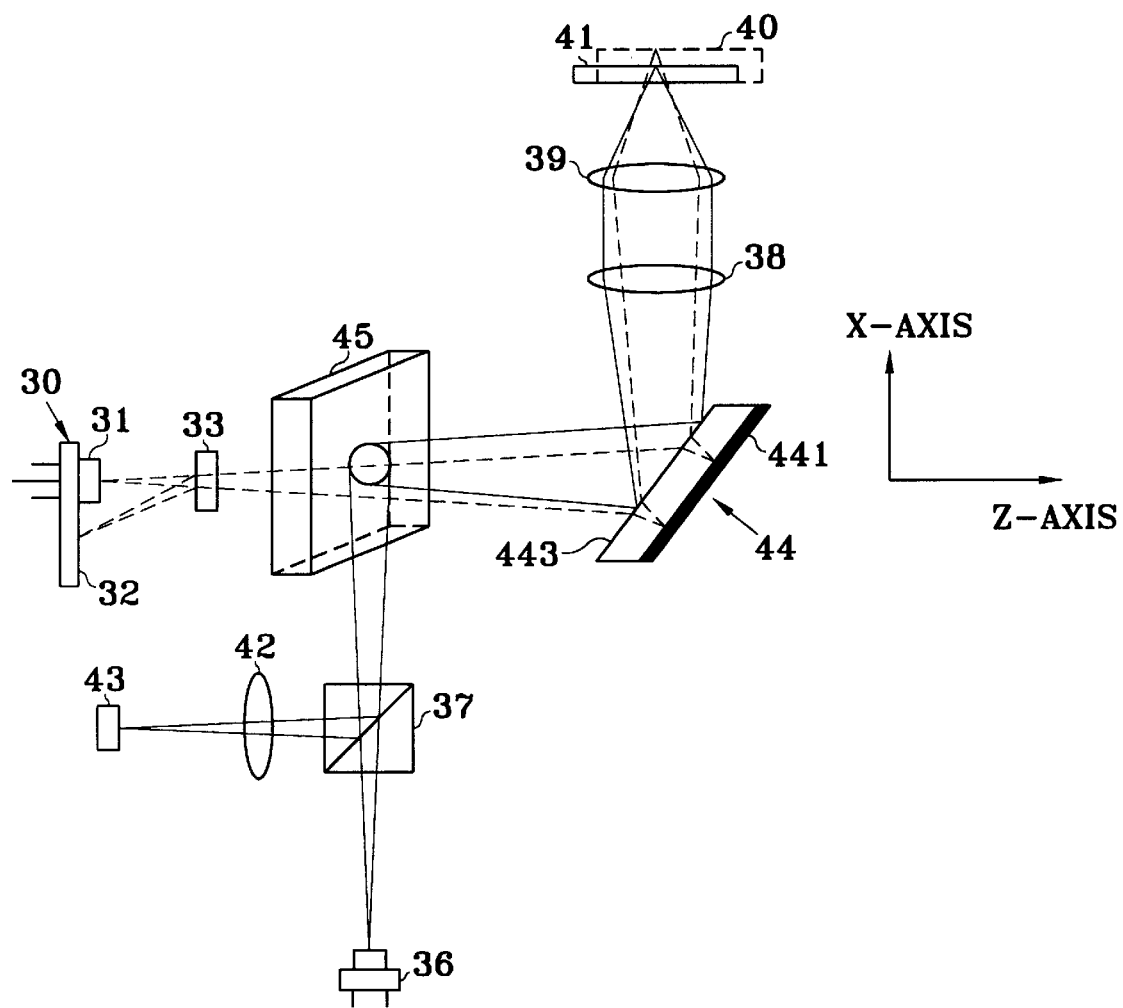
FIG. 4 is a view showing an optical system of an optical pickup according to a second embodiment of the present invention.

FIG. 4 is a view showing an optical system of an optical pickup according to a second embodiment of the present invention. The optical pickup shown in FIG. 4 includes a reflective aberration correction plate 44 which reflects both the first light of the 780 nm wavelength and the second light of the 650 nm wavelength, instead of the aberration correction plate 34 of FIG. 3 transmitting the first light. The reflective aberration correction plate 44 is fabricated in the form of a plane-parallel plate and includes a first reflective plane 441 for reflecting the first light and a second reflective plane 443 for reflecting the second light. The first reflective plane 441 is formed by coating a total reflection material on the surface of a transparent plate glass and the like. The optical elements shown in FIG. 4 have the same functions as those of the corresponding optical elements of FIG. 3. However, since the optical pickup of FIG. 4 uses the reflective aberration correction plate 44, when the X-, Y- and Z-axes used in the description of the optical system of FIG. 3 are used as they are, the optical axis of the objective lens 39 is parallel with the X-axis. The collimator 38 is located on the optical path between the aberration correction plate 44 and the objective lens 39.

The optical surfaces of a beam splitting plate 45 shown in FIG. 4 are aligned in parallel to the plane obtained by rotating the XY-plane clockwise through an angle of 45 degrees centered around the positive X-axis. In other words, the optical surfaces of the beam splitting plate 45 are aligned in parallel with the optical surfaces of the aberration correction plate 34 as shown in FIG. 3. The optical surfaces of the reflective aberration correction plate 44 are aligned in parallel to the plane obtained by rotating the XY-plane clockwise through an angle of 45 degrees centered around the Y-axis. Thus-aligned aberration correction plate 44 is for removing astigmatism as well, and has half of the thickness of the beam splitting plate 45. Therefore, the first reflective plane 441 of the aberration correction plate 44 removes astigmatism occurring due to the first light which is transmitted through the beam splitting plate 45.

Figure 5A:
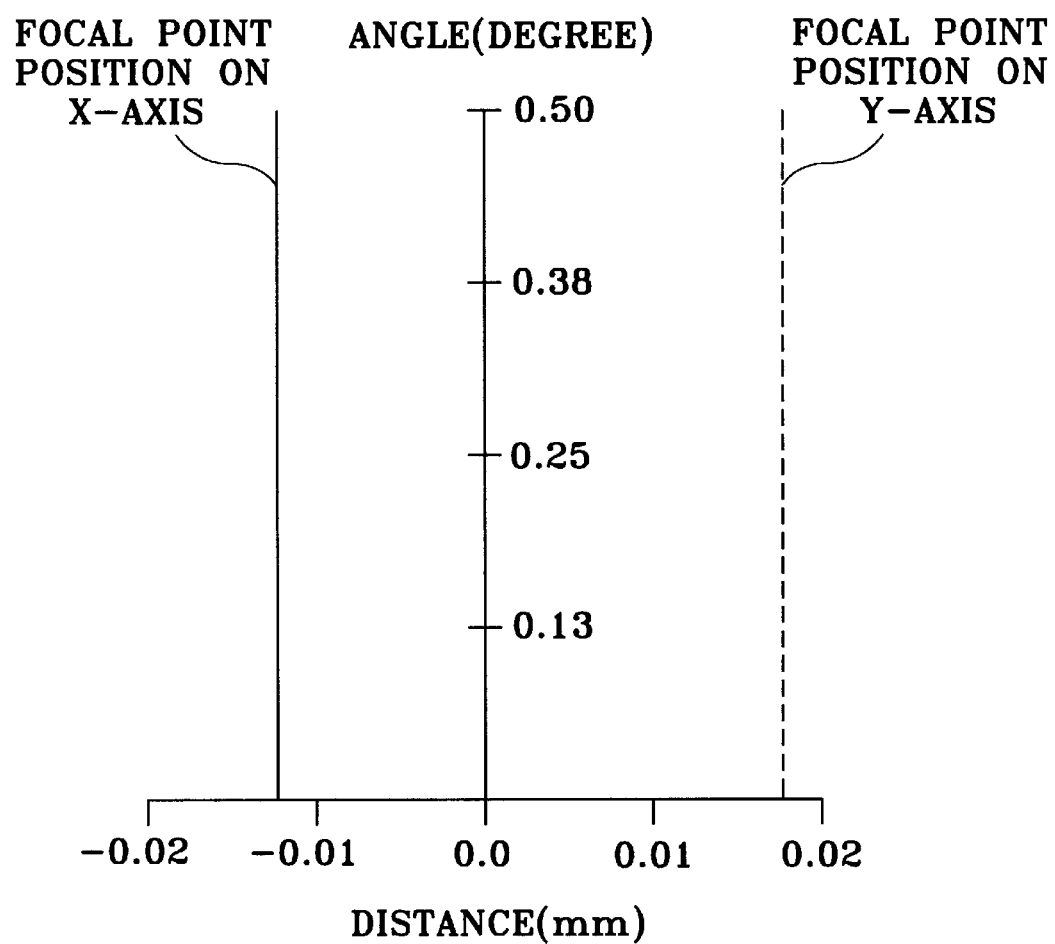
FIGS. 5A and 5B are views for explaining that astigmatism decreases by use of an aberration correction plate.
Figure 5:
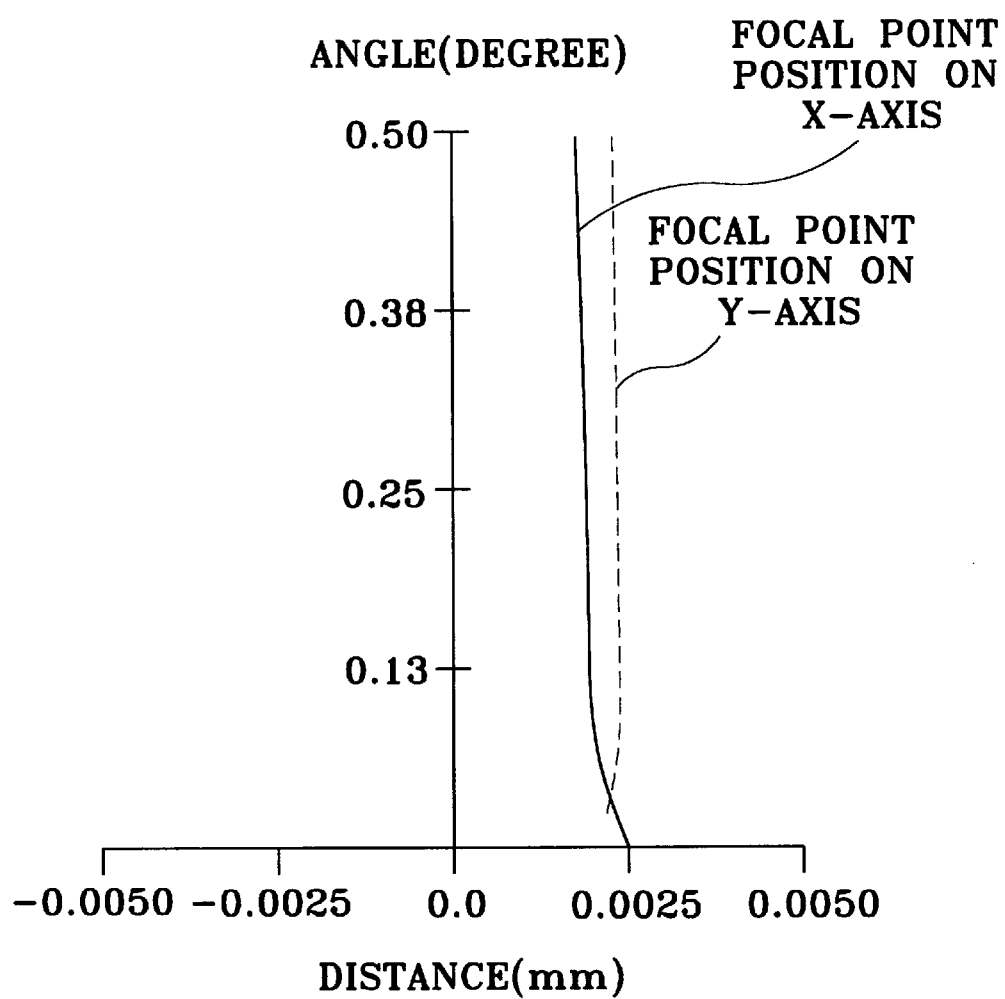

FIGS. 5A and 5B show astigmatic field curves. FIG. 5A shows astigmatism possessed by the optical system of the optical pickup of FIG. 3 or 4 quantitatively, when the aberration correction plate 34 or 44 is not used. FIG. 5B shows astigmatism possessed by the optical system of the optical pickup of FIG. 3 or 4 quantitatively, when the aberration correction plate 34 or 44 is used. When using a rectangular coordinate system, in which a position on the information recording surface of the CD-R 40 located on the optical axis of the objective lens 39 is used as the origin of the rectangular coordinate system, the X- and Y-axes are parallel with those of FIG. 3 respectively, and the Z-axis is parallel with the chief ray of the first light of the 780 nm wavelength, the amount of the astigmatism, that is, an astigmatic difference, for the chief ray of the first light is represented as a distance between a position of a focal point on the X-axis and a position of the focal point on the Y-axis measured along the Z-axis. Here, the focal point position on the X-axis and the focal point position on the Y-axis are positions on the X- and Y-axes where focal lines formed by a chief ray of the first light are located. In FIGS. 5A and 5B, the horizontal axis denotes a distance from the origin to each of a focal point position on the X-axis and a focal point position on the Y-axis measured along the Z-axis, and the vertical axis denotes a degree that any chief ray of the first light being actually incident to the objective lens 39 is deviated from the optical axis of the objective lens 39. The angle of the optical axis of the objective lens 39 is defined as a zero degree.

As can be seen from the comparison between FIGS. 5A and 5B, when the aberration correction plate 34 or 44 according to the first and second embodiments of the present invention is used, the astigmatism is remarkably reduced as shown in FIG. 5B. The astigmatism characteristic shown in FIG. 5B is substantially the same as that of a general lens. Therefore, the optical pickup according to the present invention has an amount of astigmatism within an allowable clearance and can be compatible with a DVD and a CD-R.

As described above, the optical pickup according to the present invention can record and pick up signals with respect to both a DVD and a CD-R, and can perform a pickup operation with respect to an existing CD as well. Further, the optical pickup according to the present invention can use a beam splitting plate which is fabricated in the form of a plate using a plate glass which is widely used in a relevant optical technological field, which cause an ultra-light and low-priced product to be manufactured. Also, an optical aberration occurring in the beam splitting plate is removed using an aberration correction plate fabricated in the form of a plate, which provides a more stable signal.

While only certain embodiments of the invention have been specifically described herein, it will be apparent that numerous modifications may be made thereto without departing from the spirit and scope of the invention.

What is claimed is:

1. An optical pickup compatible with at least two types of recording media, the optical pickup comprising:

a first laser light source to emit a first light beam having a relatively long wavelength;

a second laser light source to emit a second light beam having a relatively short wavelength;

an objective lens to focus the second light beam emitted from said second laser light source on an information recording surface of a second of at least two types of optical recording media, wherein the information recording surface of the second optical recording medium is a first distance from the objective lens, to form an optical spot optimized to the second recording medium;

a collimator to collimate an incident beam of light and to transmit the collimated light beam to the objective lens;

a beam splitting plate to transmit one of the first and second light beams from the corresponding one of said first and second laser light sources, and reflecting the other one of said first and second light beams from the corresponding other one of said first and second light sources, to transmit the first and second light beams to said collimator as the incident light beam; and an aberration correction plate located on an optical path between said beam splitting plate and one of said first and second light sources, to correct an optical aberration occurring due to said beam splitting plate, wherein an information recording surface of a first of the at least two types of optical recording media is a second distance from said objective lens greater than said first distance, and an optical distance from said first laser light source to the information recording surface of the first optical recording medium is shorter than an optical distance from said second laser light source to the information recording surface of the second optical recording medium, thereby removing a spherical aberration occurring when the first light beam is used.

2. The optical pickup according to claim 1, wherein said beam splitting plate transmits the first light beam and reflects the second light beam.

3. The optical pickup according to claim 2, wherein said beam splitting plate has a form of a plane-parallel plate.

4. The optical pickup according to claim 2, wherein said aberration correction plate is located on the optical path between said first laser light source and said beam splitting plate.

5. The optical pickup according to claim 4, wherein said optical aberration corrected by said aberration correction plate is astigmatism.

6. The optical pickup according to claim 5, wherein said first laser light source and said objective lens are aligned so that an optical axis of a direction proceeding from said first laser light source via an optical center of the objective lens is coincident with a positive Z-axis direction in a rectangular coordinate system, said second laser light source and said beam splitting plate are aligned so that an optical axis of a direction proceeding from said second laser light source toward an optical center of said beam splitting plate is parallel to a positive X-axis direction, the planes of said beam splitting plate are aligned in parallel to a plane obtained by rotating an XY-plane clockwise through an angle of 45 degrees centered around the positive Y-axis, and, the planes of said aberration correction plate are aligned in parallel to the plane obtained by rotating the XY-plane clockwise through an angle of 45 degrees centered around one of the positive X-axis and the negative X-axis.

7. The optical pickup according to claim 6, wherein said aberration correction plate has a form of a plane-parallel plate.

8. The optical pickup according to claim 7, wherein said aberration correction plate has a same thickness as that of said beam splitting plate.

9. The optical pickup according to claim 1, further comprising:

beam splitter means for individually splitting light beams reflected from corresponding ones of the first and second optical recording media and proceeding toward said first and second laser light sources from the optical paths formed by the first and second light beams emitted from said first and second laser light sources; and photodetectors to individually receive the light beams split by said beam splitter means, wherein each of said photodetectors is made into a single unit together with a corresponding one of said first and second laser light sources.

10. The optical pickup according to claim 1, wherein the first optical recording medium is a recordable compact disk (CD-R) and the second optical recording medium is a digital video disk (DVD).

11. An optical pickup compatible with at least two types of recording media, the optical pickup comprising:

a first laser light source to emit a first light beam having a relatively long wavelength;

a second laser light source to emit a second light beam having a relatively short wavelength;

an objective lens to focus the second light beam emitted from said second laser light source on an information recording surface of a second of at least two types of optical recording media, wherein the information recording surface of the second optical recording medium is a first distance to the objective lens, to form an optical spot optimized to the second recording medium;

a collimator to collimate an incident beam of light and to transmit the collimated light beam to the objective lens;

a beam splitting plate to transmit one of the first and second light beams light from the corresponding one of said first and second laser light sources, and reflecting the other one of said first and second light beams from the corresponding other one of said first and second laser light sources, to transmit the first and second light beams to said collimator as the incident light beam; and an aberration correction plate to reflect the light beam transmitted from said beam splitting plate into said collimator, to correct an optical aberration occurring due to said beam splitting plate, wherein an information recording surface of a first of the at least two types of optical recording media is a second distance from said objective lens greater than said first distance, and an optical distance from said first laser light source to the information recording surface of the first optical recording medium is shorter than an optical distance from said second laser light source to the information recording surface of the second optical recording medium, thereby removing a spherical aberration occurring when the first light beam is used.

12. The optical pickup according to claim 11, wherein said beam splitting plate transmits the first light beam and reflects the second light beam.

13. The optical pickup according to claim 12, wherein said beam splitting plate has a form of a plane-parallel plate.

14. The optical pickup according to claim 12, wherein said optical aberration corrected by said aberration correction plate is astigmatism.

15. The optical pickup according to claim 14, wherein said first laser light source, said beam splitting plate and said aberration correction plate are aligned so that an optical axis of a direction proceeding from said first laser light source via said beam splitting plate to said aberration correction plate is coincident with a positive Z-axis direction in a rectangular coordinate system, said second laser light source and said beam splitting plate are aligned so that an optical axis of a direction proceeding from said second laser light source toward an optical center of said beam splitting plate is parallel to a positive X-axis direction, the planes of said beam splitting plate are aligned in parallel to the plane obtained by rotating an XY-plane clockwise through an angle of 45 degrees centered around the positive X-axis, and, the planes of said aberration correction plate are aligned in parallel to the plane obtained by rotating the XY-plane clockwise through an angle of 45 degrees centered around the positive Y-axis.

16. The optical pickup according to claim 15, wherein said aberration correction plate has a form of a plane-parallel plate.

17. The optical pickup according to claim 16, wherein said aberration correction plate reflects the first light beam from a first reflective surface and reflects the second light beam from a second reflective surface disposed toward said beam splitting plate, and has half of a thickness of said beam splitting plate.

18. The optical pickup according to claim 11, further comprising:

beam splitter means for individually splitting light beams reflected from corresponding ones of the first and second optical recording media and proceeding toward said first and second laser light sources from the optical paths formed by the first and second light beams emitted from said first and second laser light sources; and optical detectors to individually receive the light beams split by said beam splitter means, wherein each of said optical detectors is made into a single unit together with a corresponding one of said first and second laser light sources.

19. The optical pickup according to claim 11, wherein the first optical recording medium is a recordable compact disk (CD-R) and the second optical recording medium is a digital video disk (DVD).

20. An optical pickup compatible with first and second types of optical recording media, comprising:

a first laser light source to emit a first light beam having a first wavelength;

a second laser light source to emit a second light beam having a second wavelength shorter than the first wavelength;

a beam splitting plate having a wavelength-selective transmission characteristic with respect to the first and second light beams; and an aberration correction plate to correct an optical aberration of one of the first and second light beams as a result of said beam splitting plate.

21. The optical pickup as claimed in claim 20, wherein:

said beam splitting plate transmits the first light beam and reflects the second light beam;

said aberration correction plate is positioned between said first light source and said beam splitting plate, and corrects the optical aberration of the first light beam;

the optical pickup further comprises a collimator to receive the first light beam passed from said beam splitting plate and the second light beam reflected from said beam splitting plate, to generate corresponding first and second collimated light beams; and an objective lens to focus the first and second collimated light beams on the corresponding first and second types of optical recording media.

22. The optical pickup as claimed in claim 20, wherein:

said beam splitting plate transmits the second light beam and reflects the first light beam;

said aberration correction plate is positioned between said second light source and said beam splitting plate, and corrects the optical aberration of the second light beam;

the optical pickup further comprises a collimator to receive the second light beam passed from said beam splitting plate and the first light beam reflected from said beam splitting plate, to generate corresponding second and first collimated light beams; and an objective lens to focus the first and second collimated light beams on the corresponding first and second types of optical recording media.

23. The optical pickup as claimed in claim 20, wherein said beam splitting plate and said aberration correction plate are plane-parallel plates.

24. The optical pickup according to claim 21, wherein said beam splitting plate and said aberration correction plate are plane-parallel plates and said first laser light source and said objective lens are aligned so that an optical axis of a direction proceeding from said first laser light source via an optical center of the objective lens is coincident with a positive Z-axis direction in a rectangular coordinate system, said second laser light source and said beam splitting plate are aligned so that an optical axis of a direction proceeding from said second laser light source toward an optical center of said beam splitting plate is parallel to a positive X-axis direction, the planes of said beam splitting plate are aligned in parallel to a plane obtained by rotating an XY-plane clockwise through an angle of 45 degrees centered around the positive Y-axis, and, the planes of said aberration correction plate are aligned in parallel to the plane obtained by rotating the XY-plane clockwise through an angle of 45 degrees centered around one of positive X-axis and the negative X-axis.

25. The optical pickup according to claim 22, wherein said beam splitting plate and said aberration correction plate are plane-parallel plates and said second laser light source and said objective lens are aligned so that an optical axis of a direction proceeding from said second laser light source via an optical center of said objective lens is coincident with a positive Z-axis direction in a rectangular coordinate system, said first laser light source and said beam splitting plate are aligned so that an optical axis of a direction proceeding from said first laser light source toward an optical center of said beam splitting plate is parallel to a positive X-axis direction, the planes of said beam splitting plate are aligned in parallel to a plane obtained by rotating an XY-plane clockwise through an angle of 45 degrees centered around the positive Y-axis, and, the planes of said aberration correction plate are aligned in parallel to the plane obtained by rotating the XY-plane clockwise through an angle of 45 degrees centered around one of the positive X-axis and the negative X-axis.

26. The optical pickup as claimed in claim 20, wherein said beam splitting plate comprises:

a glass plate; and an optical thin film formed on said glass plate.

27. The optical pickup as claimed in claims 21, wherein the first collimated light beam is slightly diverging upon passing through said collimator.

28. The optical pickup as claimed in claim 21, wherein an optical distance from said first laser light source to an information recording surface of the first type optical recording medium is less than an optical distance from said second laser light source to an information recording surface of the second type optical recording medium.

29. The optical pickup as claimed in claim 22, wherein an optical distance from said second laser light source to an information recording surface of the second type optical recording medium is more than an optical distance from said first laser light source to an information recording surface of the first type optical recording medium.

30. The optical pickup as claimed in claim 20, wherein an optical distance from said first laser light source to an information recording surface of the first type optical recording medium is less than an optical distance from said second laser light source to an information recording surface of the second type optical recording medium.

31. The optical pickup as claimed in claim 20, wherein:

said beam splitting plate transmits the first light beam and reflects the second light beam;

the optical pickup further comprises a collimator to receive the first and second light beams reflected by said aberration correction plate, to generate corresponding first and second collimated light beams; and an objective lens to focus the first and second collimated light beams on the corresponding first and second types of optical recording media;

said aberration correction plate is positioned in an optical path between said beam splitting plate and said collimator, reflects the first and second light beams incident from said beam splitting plate, and corrects the optical aberration of the first light beam.

32. The optical pickup according to claim 31, wherein said first laser light source, said beam splitting plate and said aberration correction plate are aligned so that an optical axis of a direction proceeding from said first laser light source via said beam splitting plate to said aberration correction plate is coincident with a positive Z-axis direction in a rectangular coordinate system, said second laser light source and said beam splitting plate are aligned so that an optical axis of a direction proceeding from said second laser light source toward an optical center of said beam splitting plate is parallel to a positive X-axis direction, the planes of said beam splitting plate are aligned in parallel to the plane obtained by rotating an XY-plane clockwise through an angle of 45 degrees centered around the positive X-axis, and, the planes of said aberration correction plate are aligned in parallel to the plane obtained by rotating the XY-plane clockwise through an angle of 45 degrees centered around the positive Y-axis.

33. The optical pickup as claimed in claim 31, wherein an optical distance from said first laser light source to an information recording surface of the first type optical recording medium is less than an optical distance from said second laser light source to an information recording surface of the second type optical recording medium.

34. The optical pickup according to claim 31, wherein said aberration correction plate reflects the first light beam from a first reflective surface and reflects the second light beam from a second reflective surface disposed toward said beam splitting plate, and has half of a thickness of said beam splitting plate.

* * * * *